United States Patent

[11] 3,567,100

| [72] | Inventors | Charles G. Farmer<br>Edelstein;<br>Calvin D. Loyd, Peoria, Ill. |
|---|---|---|
| [21] | Appl. No. | 728,646 |
| [22] | Filed | May 13, 1968 |
| [45] | Patented | Mar. 2, 1971 |
| [73] | Assignee | Caterpillar Tractor Co.<br>Peoria, Ill. |

[54] FRICTION-WELDING APPARATUS AND METHOD
11 Claims, 6 Drawing Figs.

[52] U.S. Cl. .................................................. 228/2,
29/470.3, 156/73, 228/44
[51] Int. Cl. .............................................. B23k 27/00
[50] Field of Search ............................................ 228/2;
156/73; 29/470.3

[56] References Cited
UNITED STATES PATENTS

| 1,951,906 | 3/1934 | Hansen ........................ | 74/109 |
| 3,002,871 | 10/1961 | Tramm et al. ................. | 228/2X |
| 3,455,494 | 7/1969 | Stamm ......................... | 228/2 |
| 3,469,300 | 9/1969 | Nagin ........................... | 228/2X |

Primary Examiner—John F. Campbell
Assistant Examiner—Robert J. Craig
Attorney—Fryer, Tjensvold, Feix, Phillips & Lempio ABSTRACT: Friction-welding apparatus comprising a rack and pinion for translating force from a unidirectionally, linearly acting hydraulic motor into rotational force and applying the resultant rotational force to one of a pair of relatively rotatable weld pieces. Programming means regulate operation of the hydraulic motor to precisely determine energy input to a weld interface between the weld pieces.

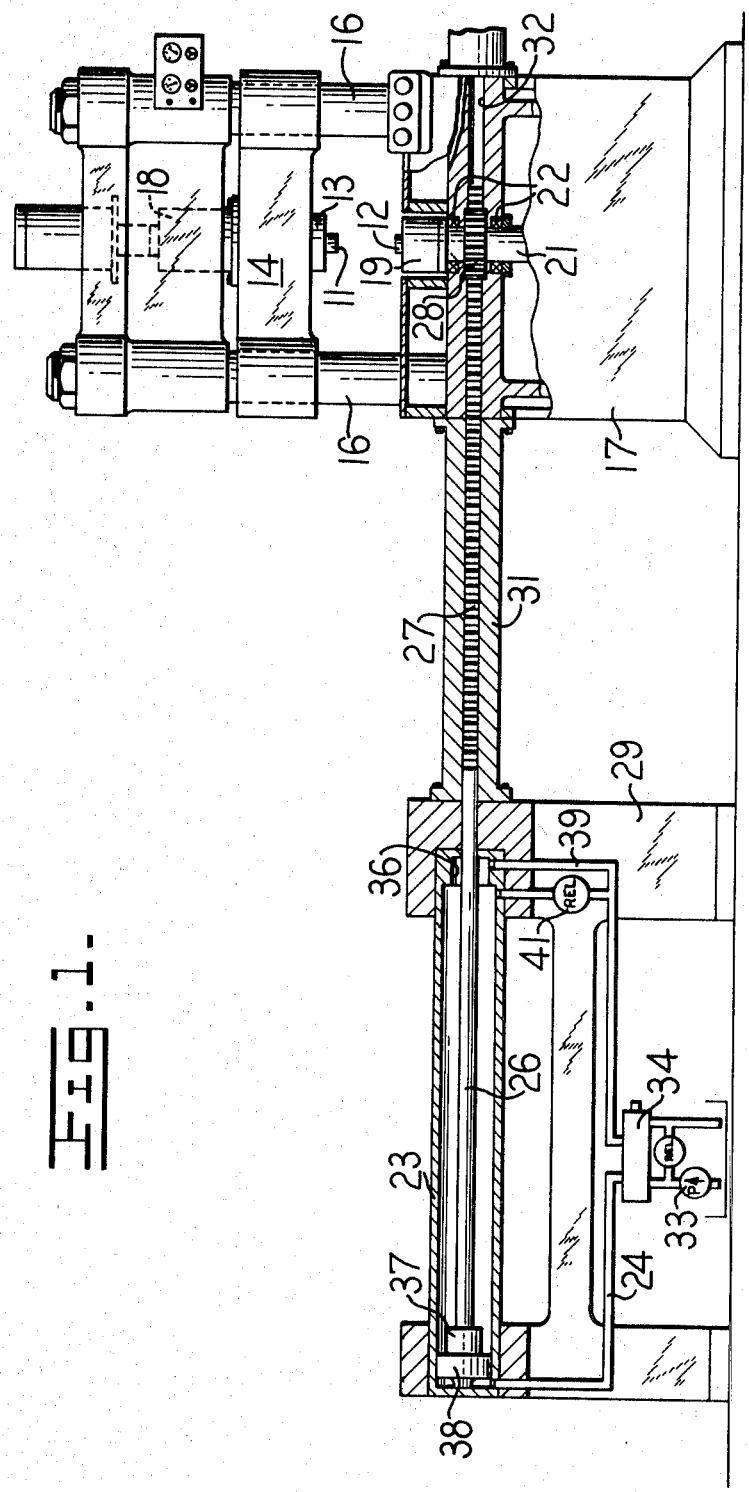

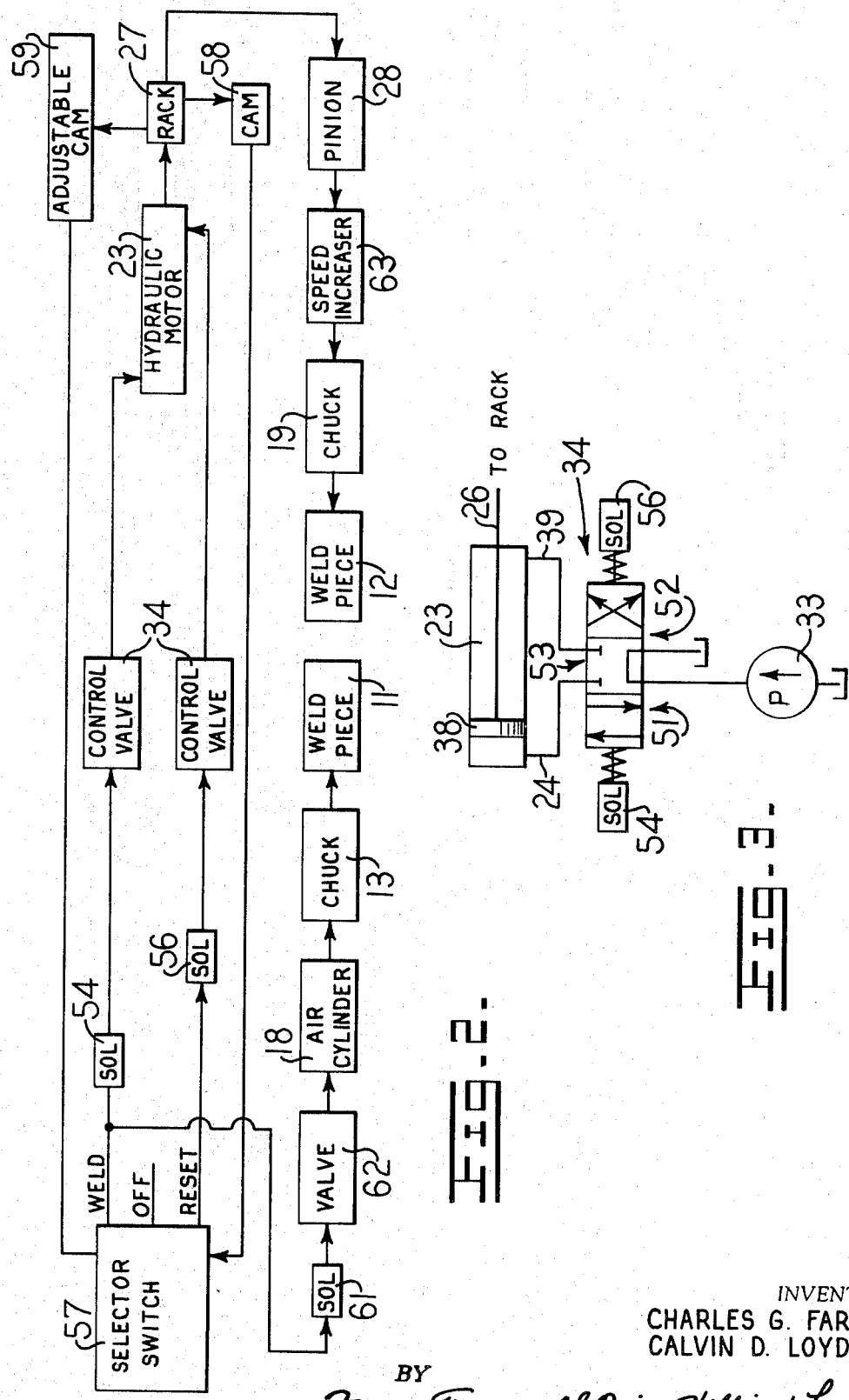

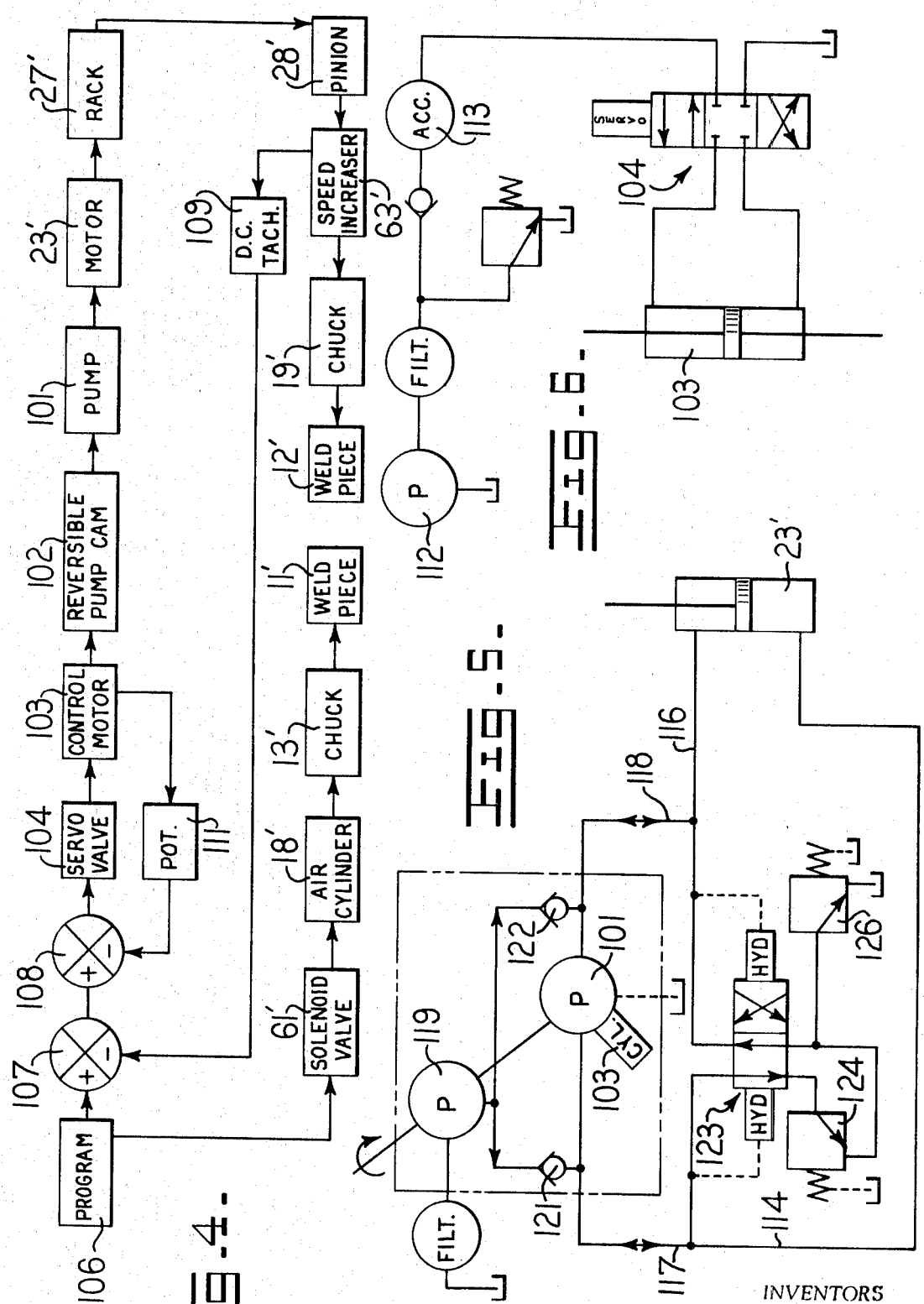

FRICTION-WELDING APPARATUS AND METHOD

BACKGROUND OF THE INVENTION

Friction welding is broadly comprised of pressing two weld pieces together at a common interface under suitable pressure and urging them into relative motion to develop frictional contact at their interface. By means of the frictional contact, heat is generated at the interface to effect a plastic weld condition. The energy content, which may be broken down into the duration and rate of energy transmission to the interface to form a suitable bond, is selected according to criteria which are well known in the prior art. Among prior art procedures, conventional friction welding generally refers to a process where one of the weld pieces is relatively rotated while in contact with the other weld piece under a load axial to their interface. The speed of rotation may be generally constant with the duration of the relative rotation selected to determine the energy provided at the interface. Inertial welding is a variation of the above process in that prior to axial engagement, one of the weld pieces is rotated to a predetermined speed in association with a selected inertial mass. The other weld piece is typically secured against rotation and brought into frictional engagement with the rotating weld piece at a common interface. At least a predeterminable portion of the inertial energy in the rotating weld piece and associated inertial mass is thus transferred to the interface of the weld pieces to condition it for bonding. This process is generally characterized by a relatively high initial rate or rotational speed between the weld pieces which diminishes during the welding process. This process is particularly effective in many applications since the high initial rate of relative rotation quickly heats the interface to a suitable plastic condition and is followed by prolonged relative rotation at lower rates which is effective for plastic working of material at the interface which is susceptible to grain growth to refine the grain. The amount and rate of energy to be transferred to the interface varies, for example, with the composition, configuration and mass of the weld pieces. Either of the above processes may be particularly effective for a given combination of such characteristics. However, both processes are usually performed with equipment including a motor applying rotational drive to one of the weld pieces. Generally complex equipment is provided to control critical welding parameters such as the duration and rate of relative rotation, etc.

Reciprocable welding is another type of process where one weld piece is caused to move relative to the other weld piece generally in a reciprocating or backward and forward fashion. This process is employed, for example, where the weld piece configuration does not permit relative rotation. Otherwise, the process generally involves the same considerations as to the amount and rate of energy transfer to the weld interface, etc.

The apparatus and methods of operation for each of the above processes are not always readily adaptable to a wide variety of welding conditions. Complex componentry and controls to make these processes more versatile also tend to increase capital costs and complexity of operation. Accordingly, it is desirable to provide novel friction-welding apparatus and methods of welding which permit the use of simplified components and which are readily adaptable to a wide variety of friction welding applications.

SUMMARY OF THE INVENTION

The present invention fulfills the above needs by employing friction welding apparatus in which drive means are effective to produce a precisely controlled, limited amount of unidirectional, linear motion during the welding portion of each weld cycle to set the weld pieces in relative motion under pressure to achieve bonding. Translating means translate the unidirectional, linear motion into suitable motion such as rotation or reciprocable motion which is applied to the weld pieces in order to set them into relative motion and develop frictional contact at their interface suitable for bonding. The translating means are preferably a rack and pinion assembly for setting the weld pieces into relative rotation.

Programming means are preferably associated with the drive means to selectively regulate energy delivered to the weld interface.

A preferred mode of operation within the present invention comprises the step of pressing two weld pieces together at a common interface and driving them in rubbing contact with drive or motor means of the type described immediately above.

Accordingly, it is an object of the invention to provide friction-welding apparatus effective to produce a precisely controlled, limited amount of unidirectional, linear motion during the welding portion of each weld cycle for moving two weld pieces in relative motion.

It is another object to provide programming means for precisely regulating energy delivered to the interface of the weld pieces for effecting a suitable bond. The programming means are preferably effective to simulate conventional friction welding or inertial welding techniques or to provide varied parameters as dictated by particular welding applications.

It is another object to provide a method of pressing two weld pieces together and driving them in rubbing contact by motor means effective to produce a precisely controlled, limited amount of unidirectional, linear motion during the welding portion of each weld cycle.

Thus, the present invention permits precise regulation of critical welding parameters and particularly of the rate and duration of energy delivery to an interface between two weld pieces. Since the drive or motor means produces unidirectional, linear motion for setting the weld pieces in relative motion, both the duration and rate of the motion produced by the motor are susceptible to very precise regulation or programming. Since these characteristics determine the rate and duration of energy consumption at the weld interface, the invention permits selective regulation of welding parameters precisely suited to various welding applications. These same characteristics also determine the total amount of relative motion between the weld pieces. Thus, the invention also permits very precise angular alignment of the weld pieces at completion of a weld cycle. Alignment of the welded pieces is often necessary and sometimes of critical importance in certain applications so that versatility of the present welding apparatus and method is further extended. With a rack and pinion employed to translate the unidirectional, linear motion into relative rotation of the weld pieces, the characteristics of rate and duration may both be precisely established through selection and close regulation of the distance through which the motor and rack are operable or of the number of turns to be experienced by the pinion during the welding portion of each weld cycle.

Other objects and advantages are made apparent in the following description having reference to the accompanying drawings wherein:

FIG. 1 is a side elevation view, with parts in section, of a friction-welding machine incorporating apparatus of the present invention and for practicing the welding method of the invention;

FIG. 2 is a block diagram of programming means for regulating operation of the apparatus of FIG. 1;

FIG. 3 is a schematic representation of hydraulic control means for use in conjunction with the programming means of FIG. 2;

FIG. 4 is a block diagram of alternate programming means for regulating operation of a welding machine generally similar to that shown in FIG. 1 to selectively vary welding speed as well as duration during each weld cycle; and FIGS. 5 and 6 are schematic representations of hydraulic drive and alternate hydraulic control means respectively for use in conjunction with the alternate programming means of FIG. 4.

A friction-welding machine is illustrated in FIG. 1 for the bonding of two weld pieces 11 and 12. In accordance with conventional practice, the weld pieces are to be urged together under suitable pressure loading with their adjacent surfaces forming an interface for bonding. The weld pieces are placed in relative motion to develop frictional contact at their interface. By means of this frictional contact and by controlling the relative motion of the weld pieces, a selected quantity of energy is transferred to the interface to achieve suitable bonding temperature or plastic condition and for plastic working of material at the interface which is susceptible to grain growth to refine the grain. The energy characteristics required at the interface are of critical importance and vary substantially with composition, shape and mass of the weld pieces, for example. For different weld piece compositions, different bonding temperatures are required along with widely varying amounts of plastic working. In some applications, very little if any additional working is required after the appropriate bonding temperature is reached. The relative motion of the weld pieces may take any of numerous forms, for example, rotating or reciprocating motion.

The method of imparting relative motion to the weld pieces may similarly vary. For purposes of describing a specific embodiment, one of the weld pieces 11 is secured against rotation by a conventional tailstock chuck 13 which is supported on a cross member 14. The cross member is slidably mounted on risers 16 for axial motion relative to the other weld piece 12. The risers are mounted in turn on a base structure 17. Pressure-loading means which may comprise an air cylinder 18 are mounted on the risers and are coupled with the crossmember for urging the weld pieces into engagement at their interface under selected pressure.

The other weld piece is mounted for rotation upon a spindle chuck 19 which is rotatable along with its supporting spindle shaft 21 on bearings 22. Application of suitable rotational force to the weld piece 12, with the cylinder 18 being extended to properly urge the weld pieces into pressure engagement, transfers energy to their interface as necessary for bonding.

For the application of resultant or rotational force to the weld piece 12, motor or drive means such as the double-acting hydraulic cylinder 23 are operable under precise control for providing unidirectional, linear motion during the welding portion of each weld cycle to set the weld pieces into relative motion for bonding as described above. In the illustrated embodiment, introduction of fluid under pressure to the head end of the cylinder through a conduit 24 causes its rod 26 to extend (or retract) during each weld cycle to provide the unidirectional, linear motion.

Means for translating the linear motion into suitable resultant or rotational force for application to the weld piece 12 are provided by a rack 27 and pinion 28. Regulation of the rate of fluid flow from the pump to the cylinder provides rectilinear motion in the rod 26 which establishes appropriate rectilinear velocity for a particular welding application. That motion is simultaneously translated into rotational motion and applied to the weld piece 12 by the rack and pinion to effect a bond between the weld pieces.

Since it is necessary to cause very rapid extension of the cylinder 23 for many welding applications, some means are necessary to snub the rod as it approaches its fully extended position to avoid damage to the hydraulic circuitry or mechanical components. Such means could be included in the programming and control apparatus described below. However, those means may be simply embodied in the reduced cylindrical portion 36 at the rod end of the cylinder 23 and the cylindrical portion 37 of mating diameter mounted on the rod adjacent its piston 38. A fluid conduit 39 between the valve 34 and rod end of the cylinder is communicated with the reduced cylindrical portion 36. As the rod 26 approaches its fully extended position, the cylindrical portions 36 and 37 isolate the conduit 39 and form a closed chamber within the cylinder which is communicated to drain through a relief valve 41. Rising pressure in the closed chamber resists extension of the rod and provides a cushioning effect as the increasing fluid pressure is relieved by the valve 41. The control valve 34 may be repositioned to direct fluid under pressure to the rod end of the cylinder to retract the rod and reset the rack and pinion for a new welding cycle.

As discussed above, the amount of energy and the rate at which it is transferred to the weld interface are examples of parameters which are particularly determinative of the characteristics of a bond formed by friction welding. Prior art experience indicates that it is often desirable to preselect such parameters to simulate conventional friction welding and inertial welding techniques. It is additionally desirable to be able to freely and independently select these parameters for optimizing bond characteristics in still other applications. It is apparent that the apparatus described above is particularly adaptable to programming of the necessary parameters.

Accordingly, programming means are provided for controlling parameters such as those described above to thereby regulate the energy transferred to the interface from the motor means.

One embodiment of such programming apparatus is illustrated in FIG. 2 and, together with hydraulic control apparatus illustrated in FIG. 3, provides for substantially constant speed operation of the hydraulic motor of FIG. 1 to generally simulate conventional friction welding techniques, for example. Components in FIGS. 2 and 3 which are identical with components described above with reference to FIG. 1 are identified by the same numerals.

In this embodiment, the control valve 34 is operable in three positions: a Weld position 51 wherein fluid from the pump 33 is directed to the head end of the cylinder 23 for extension of its rod and initiation of a welding cycle; a Reset position 52 wherein fluid is directed to the rod end of the cylinder for retraction of the rod and repositioning of the rack and pinion between cycles; and a central Off position 53 wherein the pump 33 is isolated from the cylinder. The control valve is normally spring centered at its Off position 53. A first solenoid 54 is operable in response to an appropriate electrical signal to reposition the control valve to its Weld position 51. A second solenoid 56 is similarly operable in response to an electrical signal to reposition the control valve to its Reset position 52. The spring-centered control valve is always returned to its Off position 53 when both of the solenoids are deactuated.

A three-position selector switch 57 is electrically coupled with the solenoids 54 and 56 to control their operation as discussed in greater detail below. The switch is operable to its Off or Reset position in response to actuation of a cam 58. The cam 58 is associated with the rack 27 to be actuated as the rack is extended by the motor to indicate completion of a weld operation. The switch is also operable to its Off position from its Reset position in response to actuation of an adjustable cam 59. The cam 59 is also associated with the rack 27 to be actuated as the rack is retracted to properly position the motor components and rack for commencement of a new weld cycle. As the adjustable cam 59 is linearly repositioned relative to the rack, it varies the starting positions of the motor components and rack to alter the distance through which the rack is operable by the motor. Thus, adjustment of the cam 59 permits selective regulation not only of welding speed but also permits additional variation of the quantity of energy to be transferred to the weld interface.

The selector switch 57 is also coupled to a third solenoid 61 which operates a valve 62. The valve 62 is associated with the pressure loading cylinder 18 so that positioning of the switch 57 to its Weld position operates the solenoid 61 to urge the weld pieces into engagement under appropriate pressure.

A speed increaser or step-up transmission 63 is provided between the pinion 28 and the spindle chuck 19 to facilitate rotational operation of the spindle chuck and weld piece 12 within appropriate speed ranges.

In operation, the pressure supplied by the pump 33 is selected to provide for operation of the motor 23, rack and pinion 27, 28 and spindle chuck 19 at an appropriate force for welding. A fluid accumulator (not shown) may be associated with the pump 33 to store a quantity of fluid under a given pressure to insure an adequate supply for whatever speeds are required of the hydraulic motor 23. The accumulator also allows the use of a smaller pump and can be charged between cycles while the weld pieces are being removed and new pieces inserted into the machine. A pressure relief valve controls the charge in the accumulator. In such a case, a variable flow control valve is commonly located in the circuit downstream of the accumulator to permit control of the motor velocity. The cam 59 is positioned to provide for operation of the motor and rack through a selected linear distance. Actuation of the selector switch 57 to its Weld position energizes the solenoid 61 for pressure loading of the weld pieces, then energizes the first solenoid 54, positions the control valve 34 to its Weld position 51 and causes the motor 23 to initiate a weld cycle. As the rack is fully extended by the motor and the welding operation approaches completion, the cam 58 is actuated to reposition the selector switch 57 to Off. The bonded weld pieces are removed, the selector switch is positioned at Reset for commencement of a new weld cycle and new weld pieces are inserted in the chucks 13 and 19 prior to repetition of the above steps to initiate a new weld cycle. In this embodiment, the adjustable cam 59 could be omitted. The distance through which the motor and rack are operable could be similarly regulated by providing for linear adjustment of the cam 58 to vary the linear point at which a weld is completed.

In some welding applications, where it is desirable to simulate inertial welding techniques, for example, it is necessary in addition to selectively regulate the welding speed or relative rotation of the weld pieces during each welding operation. Programming and control means permitting selective speed variation during a welding operation are described with reference to FIGS. 4, 5 and 6. Components which are similar to those described with reference to FIGS. 1—3 are identified by similar primed numerals. To permit selective variation of welding speed during a weld operation, a hydraulic pump 101 is connected to both the head and rod ends of the double acting hydraulic cylinder 23' as will be discussed in greater detail below with reference to FIG. 5. The pump 101 is of a conventional type having a reversible and adjustable cam 102. Proper positioning of the cam permits regulation of fluid flow to either end of the motor 23' or complete termination of fluid flow to the motor. Thus, selective operation of the cam 102 may provide for initiation and termination of each weld cycle as well as for variable rate operation of the motor. Accordingly, the adjustable cam provides for continuous adjustment of the rate of relative motion between the weld pieces and more critical regulation of energy provided to the weld interface.

Selective positioning of the cam 102 is provided by a control motor such as a double-acting hydraulic cylinder 103 having a neutral position corresponding to termination of fluid flow through the pump 101. Actuation of the control motor in one direction, for example, extension, conditions the adjustable cam pump 101 for extension of the motor 23' to initiate a weld cycle. Operation in the other direction, that is, retraction, also causes retraction of the motor 23' to reset the motor and rack 27 (see FIG. 1) for a new weld cycle. Operation of the control motor 103 is in turn regulated by a servo-operated valve 104 as is discussed below.

A programmer 106 is of a type suitable to regulate an entire weld cycle by controlling the servo valve 104. For example, it may be of a numerical control type capable of being programmed to carry out the welding operation. The programmer in combination with two summing junctions 107 and 108 and two transducers such as a DC tachometer 109 and a linear potentiometer 111 serves to regulate instantaneous welding speed and duration by controlling the cam pump 101 through the servo valve 104 and control motor 103. The programmer continuously generates an electrical signal during a welding cycle which signal is representative of desired instantaneous speed of rotation of the weld piece 12' relative to the other weld piece 11'. The DC tachometer 109 senses actual rotational speed of the weld piece 12' and generates a signal representative of that actual speed. Both the actual and desired speed signals are received by the first summing junction 107 which responds by generating a differential signal representative of instantaneous speed change. The differential speed signal is further representative of a desired position of the pump cam 102 to accomplish the necessary change in welding speed. The potentiometer 111 is associated with the control motor or cylinder 103 to sense the actual position of the pump cam which is determined by the degree of extension or retraction of the cylinder 103. The signals representative of actual and desired pump cam position are received by the second summing junction 108 which responds by generating a differential signal representative of the necessary change of pump cam position. That differential positioning signal is received by the servo valve 104 which responds to instantaneously position the pump cam to continually regulated welding speed at the rate established by the programmer. Since the pump cam is reversibly and variably operable, it is apparent that the programming and control apparatus described above is effective to regulate the entire weld cycle including initiation, control of energy input to the weld interface and termination. As with the embodiment described with reference to FIG. 2, the programmer 106 is also coupled with the solenoid valve 61' to selectively regulate axial pressure loading at the interface of the weld pieces. Having reference to FIGS. 6 and 4, the servovalve 104 is a three-position valve similar to the control valve 34 of FIGS. 2 and 3. Fluid under pressure is delivered to the control cylinder 103 from a pump 112 and a fluid pressure accumulator 113 to insure delivery of constant pressure to the control cylinder for precise positioning of the pump cam 102.

Referring to FIG. 5, the hydraulic drive arrangement between the pump 101 and motor 23' includes conduits 114 and 116 communicating the sides or manifolds 117 and 118 of the pump 101 with the head and rod ends of the cylinder 23', respectively. Since the pump 101 is reversibly operable, its manifolds 117 and 118 will alternate between high or output fluid pressure and low or inlet fluid pressure. A replenishing pump 119 is in communication with both manifolds 117 and 118 through check valves 121 and 122, respectively, to insure a constant supply of fluid in the low-pressure manifold. Thus, the replenishing pump prevents cavitation in the pump 101 and provides for accurately controlled operation of the motor 23'. The replenishing pump 119 is a fixed displacement pump which supplies fluid to make up any leakage and also maintains the desired pressure on the low-pressure side of the circuit. The excess flow from the replenishing pump 119 passes over the low pressure relief valve 126. A two-position hydraulically responsive shuttle valve 123 also selectively communicates the manifolds 117 and 118 with either high pressure or low pressure relief valves 124 and 126, respectively. The shuttle valve is operable to insure that the low pressure manifold is communicated to the low pressure relief valve and the high pressure manifold is communicated to the high pressure relief valve for proper operation and protection of the hydraulic circuit.

Thus, the present invention provides a novel friction welding machine to which simple programming means are adaptable to provide accurate energy control for a wide variety of welding applications.

I claim:

1. A friction-welding machine of the kind for bonding two weld pieces across a common interface by pressing the pieces together at their interface and moving the pieces in rubbing contact until the interface is brought to a plastic condition, comprising:
   fixture means for securing the pieces together;
   drive means;
   rack and pinion means operatively coupled between:
     the drive means and a fixture for one of the weld pieces;
     programming means operatively associated with the drive means to selectively regulate operation of the drive means and relative motion of the weld pieces; and the drive means being a hydraulic jack, a source of fluid under pressure being in communication with the jack by means of a control valve, the control valve being responsively associated with the programming means to regulate fluid flow to the hydraulic jack.

2. The combination of claim 1 wherein the one weld piece is secured for rotation with a rotatable spindle operatively connected to said pinion means and the other weld piece is secured against rotation by a suitable tailstock, said tailstock being movable and having loading means associated therewith for urging said weld pieces into engagement at their interface.

3. The combination of claim 1 wherein said drive means are capable of variable speed operation effective to vary the rate of relative motion of the weld pieces and said programming means are effective to regulate the speed of said drive means.

4. The combination of claim 3 wherein said programming means are effective to regulate said drive means for initially providing a high relative rate of motion between the weld pieces for bringing their interface to a plastic condition and thereafter providing a lower relative rate of motion between the weld pieces suitable for plastic working of material at the interface.

5. The combination of claim 1 wherein said jack includes a piston member operatively connected to said rack, said piston member being unidirectionally and linearly operable in response to said programming means.

6. The combination of claim 5 wherein said programming means includes means for closely controlling the distance through which the piston member is operable and the speed of the piston member during each weld cycle to precisely regulate relative motion between the weld pieces.

7. The combination of claim 2 wherein the pressure loading means are operatively associated with the weld piece fixtures and said programming means for urging the weld pieces into engagement at their interface in response to said programming means.

8. In a friction-welding machine of the kind for bonding two weld pieces across a common interface by pressing the pieces together at their interface while the pieces are moved in rubbing contact until the interface is brought to a plastic condition, comprising:
fixture means for holding the pieces;
loading means for pressing the pieces together;
drive means operatively connected to the fixture means for moving the pieces in rubbing contact, and wherein said drive means includes means for producing a precisely controlled, limited amount of linear motion during the welding portion of each weld cycle, said drive means comprising a double-acting hydraulic cylinder having its rod end operatively connected to the fixture means through translating means;
programming means operatively associated with said drive means and effective to selectively regulate energy delivered to the interface of the weld pieces, the programming means including means for closely controlling the distance through which the piston member is operable and the speed of the piston member during each weld cycle to precisely regulate relative motion between the weld pieces;
a source of fluid under pressure being in communication with said hydraulic cylinder by valve means which are responsively coupled to said programming means; and
said hydraulic cylinder having its head end and rod end in separate fluid communication with said valve means and having its rod operatively coupled with said translating means, said valve means being of a solenoid-operated three-position type and said programming means comprising switch means operable to a Weld position to actuate the valve means to a position for communicating fluid to one end of the cylinder, a Reset position to actuate the valve means to a position for communicating fluid to the other end of the cylinder and an Off position for actuating the valve means to a position for isolating the fluid source from both ends of the cylinder.

9. The friction-welding machine of claim 1 wherein the hydraulic motor is of a double-acting type to permit resetting of said rack and pinion between welding cycles and said variable pump has a reversible pump cam positionable by said programming means.

10. The friction-welding machine of claim 9 wherein a double-acting hydraulic control motor is operatively coupled to said pump cam to vary its position and a servovalve is interposed between the control motor and a source of fluid, the servo valve being associated with said programming means for selective operation of said control motor and positioning of said pump cam.

11. The friction-welding machine of claim 10 wherein a transducer is associated with a weld piece fixture to be rotated by the pinion to provide an electrical signal representative of the actual relative rotational speed of the weld pieces, said programming means provide an electrical signal representative of a desired instantaneous relative rotational speed for the weld pieces, first electrical summing means receive said signals from said programming means and said transducer and provide an electrical signal representative of an instantaneous desired change of relative rotational speed and accordingly of a desired position for said pump cam, second electrical summing means receive said signal from said first summing means and an output signal from a potentiometer associated with said reversible pump cam which is representative of the actual pump cam position, said second summing means to provide an output signal to said servovalve, said servovalve responsively conditioning said control motor to reposition said pump cam and provide for the desired rotational speed of the one weld piece.